US010989430B2

(12) United States Patent
Kim

(10) Patent No.: US 10,989,430 B2
(45) Date of Patent: Apr. 27, 2021

(54) AIR CONDITIONER AND METHOD FOR CONTROLLING AN AIR CONDITIONER

(71) Applicant: LG ELECTRONICS INC., Seoul (KR)

(72) Inventor: Jinho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/926,072

(22) Filed: Mar. 20, 2018

(65) Prior Publication Data

US 2018/0266719 A1 Sep. 20, 2018

(30) Foreign Application Priority Data

Mar. 20, 2017 (KR) .................. 10-2017-0034841

(51) Int. Cl.
*G05B 19/042* (2006.01)
*F24F 11/54* (2018.01)
(Continued)

(52) U.S. Cl.
CPC .............. *F24F 11/56* (2018.01); *F24F 11/30* (2018.01); *F24F 11/32* (2018.01); *F24F 11/54* (2018.01);
(Continued)

(58) Field of Classification Search
CPC .. F24F 11/56; F24F 11/30; F24F 11/54; F24F 11/32; G05B 19/042; G05B 2219/2231; G05B 2219/2614; H04W 84/20
(Continued)

(56) References Cited

U.S. PATENT DOCUMENTS 6,424,820 B1 * 7/2002 Burdick ............... H04B 5/0081
455/132
6,775,258 B1 * 8/2004 van Valkenburg ...... H04L 45/00
370/338
(Continued)

FOREIGN PATENT DOCUMENTS

CN 104566828 4/2015
EP 1 321 722 6/2003
(Continued)

OTHER PUBLICATIONS

International Search Report dated Jul. 23, 2018.
(Continued)

*Primary Examiner* — Kenneth M Lo
*Assistant Examiner* — Mohammed Shafayet
(74) *Attorney, Agent, or Firm* — KED & Associates LLP

(57) ABSTRACT

An air conditioner and a method for controlling an air conditioner are provided. The air conditioner may include a plurality of units including an outdoor unit and an indoor unit, the plurality of units being distributed at a plurality of layers or levels or floors in a building; and a controller configured to monitor and control the plurality of units. The controller and the plurality of units may include a communication unit configured to transmit/receive data in a wireless communication scheme, respectively. One of the plurality of units may be configured as a master node, and remaining units except for the unit configured as the master node may be configured as slave nodes, respectively, so that the slave node stores information on an upper parent node and a lower child node in a routing table to transmit data.

10 Claims, 11 Drawing Sheets

(51) Int. Cl.
*H04W 84/20* (2009.01)
*F24F 11/56* (2018.01)
*F24F 11/32* (2018.01)
*F24F 11/30* (2018.01)

(52) U.S. Cl.
CPC .... *G05B 19/042* (2013.01); *G05B 2219/2231* (2013.01); *G05B 2219/2614* (2013.01); *H04W 84/20* (2013.01)

(58) Field of Classification Search
USPC .......................................................... 700/277
See application file for complete search history.

(56) References Cited

U.S. PATENT DOCUMENTS

| | | | | |
|---|---|---|---|---|
| 8,730,838 | B2* | 5/2014 | Liang | H04W 84/18 370/254 |
| 2003/0128111 | A1* | 7/2003 | Sano | H04L 12/403 340/459 |
| 2003/0231585 | A1* | 12/2003 | Motegi | H04L 45/24 370/229 |
| 2004/0098390 | A1* | 5/2004 | Bayliss | G06F 16/27 |
| 2005/0149232 | A1* | 7/2005 | Shah | F24F 11/30 700/276 |
| 2005/0221752 | A1* | 10/2005 | Jamieson | H04L 45/04 455/1 |
| 2006/0090483 | A1* | 5/2006 | Kim | F24F 11/30 62/126 |
| 2006/0123811 | A1* | 6/2006 | Ha | F24F 11/62 62/175 |
| 2007/0288674 | A1* | 12/2007 | Ikeno | G05B 19/058 710/110 |
| 2008/0063003 | A1* | 3/2008 | O'Neal | H04L 12/1854 370/408 |
| 2008/0075020 | A1* | 3/2008 | Hemberger | H04L 45/02 370/255 |
| 2008/0151826 | A1* | 6/2008 | Shorty | H04L 12/2818 370/329 |
| 2009/0019067 | A1* | 1/2009 | Furusho | G06F 16/2246 |
| 2009/0024686 | A1* | 1/2009 | Nass | H04L 12/2803 709/201 |
| 2009/0290511 | A1* | 11/2009 | Budampati | H04J 3/0641 370/254 |
| 2010/0077104 | A1* | 3/2010 | O'Neal | H04L 45/02 709/252 |
| 2010/0187832 | A1* | 7/2010 | Holland | G05B 19/042 290/1 A |
| 2011/0317692 | A1* | 12/2011 | Guttman | H04L 1/1664 370/389 |
| 2012/0117287 | A1* | 5/2012 | Kashima | G06F 13/36 710/110 |
| 2012/0253521 | A1* | 10/2012 | Storm | G05D 23/1905 700/276 |
| 2013/0107770 | A1* | 5/2013 | Marsden | H04W 8/26 370/310 |
| 2014/0029567 | A1* | 1/2014 | Grady | H04W 84/18 370/330 |
| 2014/0059466 | A1 | 2/2014 | Mairs et al. | |
| 2014/0348181 | A1* | 11/2014 | Chandra | H04J 3/0667 370/503 |
| 2015/0078391 | A1* | 3/2015 | Kubo | F24F 11/83 370/400 |
| 2015/0350374 | A1* | 12/2015 | Soneda | H04W 40/02 714/4.12 |
| 2016/0061468 | A1* | 3/2016 | Alexander | G05B 15/02 700/276 |
| 2017/0307241 | A1* | 10/2017 | Alexander | G05B 15/02 |
| 2018/0123957 | A1* | 5/2018 | Chen | H04L 45/021 |

FOREIGN PATENT DOCUMENTS

| | | |
|---|---|---|
| EP | 1 868 114 | 12/2007 |
| EP | 3 285 348 | 2/2018 |
| JP | 2017-504116 | 2/2017 |
| KR | 10-2004-0084238 | 10/2004 |
| KR | 10-2010-0032796 | 3/2010 |
| KR | 10-1086266 | 11/2011 |
| KR | 10-1232928 | 2/2013 |
| KR | 10-2013-0084138 | 7/2013 |
| KR | 10-2014-0061581 | 5/2014 |

OTHER PUBLICATIONS

European Search Report dated Aug. 24, 2018
Korean Office Action dated Dec. 14, 2020 issued in Application 10-2017-0034841.
Van Der Zande et al., U.S. Pat. No 20,229,078, Issued Mar. 12, 2019,

* cited by examiner

AIR CONDITIONER AND METHOD FOR CONTROLLING AN AIR CONDITIONER

CROSS-REFERENCE TO RELATED APPLICATION(S)

This application claims the priority benefit of Korean Patent Application No. 10-2017-0034841, filed on Mar. 20, 2017 in the Korean Intellectual Property Office, the disclosure of which is incorporated herein by reference.

BACKGROUND

1. Field

An air-conditioner and a method for controlling an air conditioner are disclosed herein.

2. Background

An air conditioner is installed to provide a more pleasant indoor environment to people by discharging cold air to adjust an indoor temperature and to clean indoor air in order to configure a pleasant indoor environment. In general, the air conditioner includes an indoor unit configured by a heat exchanger installed at an inside and an outdoor unit configured by a compressor and a heat exchanger to supply refrigerant to the indoor unit.

In the air conditioner, the indoor unit configured by a heat exchanger and the outdoor unit configured by a compressor are separately controlled. The outdoor unit is connected with the indoor unit through a refrigerant pipe to supply refrigerant compressed from the compressor of the outdoor unit to the heat exchanger of the indoor unit through the refrigerant pipe. The heat-exchanged refrigerant from the heat exchanger of the indoor unit is again introduced into a compressor of the outdoor unit through the refrigerant pipe. Accordingly, the indoor unit introduces cold air into an inside through heat exchange using the refrigerant.

Air conditioners are connected with each other in a building unit or a small group unit to transmit/receive data, and monitor and control the state of each unit through the transmitted/received data. When a plurality of units is connected with each other by a communication line in the air conditioner, the units transmit data to a designated route through a connected communication line according to a connection state of the communication line.

For example, a communication line of an indoor unit is connected with an outdoor unit, and data of the indoor unit is transmitted to the outdoor unit. The data is transferred to the indoor unit through the outdoor unit. Accordingly, when the control unit communicates with the indoor unit, the data is transferred through the outdoor unit. In this case, the control unit cannot communicate with the indoor unit in a one-to-one correspondence.

Accordingly, there is growing interest in configuring a wireless communication network of an air conditioner which allows a plurality of units to communicate using a wireless scheme. However, when the plurality of units communicate use the wireless scheme, the units of the air conditioner are not concentrated in one place but are distributed at a plurality of layers. In particular, the outdoor unit is located on a rooftop so that there is a limitation in a distance. There is a time delay to process a wireless signal.

In particular, as some units fail during transferring a signal, a route should be researched for transferring the signal. In this case, a great load is applied to units of the air conditioner.

As described in Korean patent No. KR1086266B1, which is hereby incorporated by reference, when a wireless network is configured, respective nodes are divided into a master, a slave, and a repeater in a tree structure and are divided into a parent node and a child node in a hierarchy structure. In this case, the parent node includes a routing table to search a path for transmitting data.

However, in the wireless network, when a scale of the network is increased, a cost of a wireless communication device is increased. In a case of the parent node, there is a need for large storage capacity for the routing table to increase calculation load. In the tree structure, as the node is divided into a master, a slave, and a repeater, software should be mounted so that each node is differently operated according to a role thereof.

When the wireless network is simply applied to the air conditioner, as the units of the air conditioner perform functions at each node, there is a limitation in storage capacity and a large amount of calculation is performed, and it is difficult to apply a complex routing scheme so that it is difficult to easily transfer signals.

Accordingly, when a signal is blocked midway, the air conditioner cannot rapidly deal with the above. Due to blocking of the signal, the air conditioner cannot normally operate.

The above reference is incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
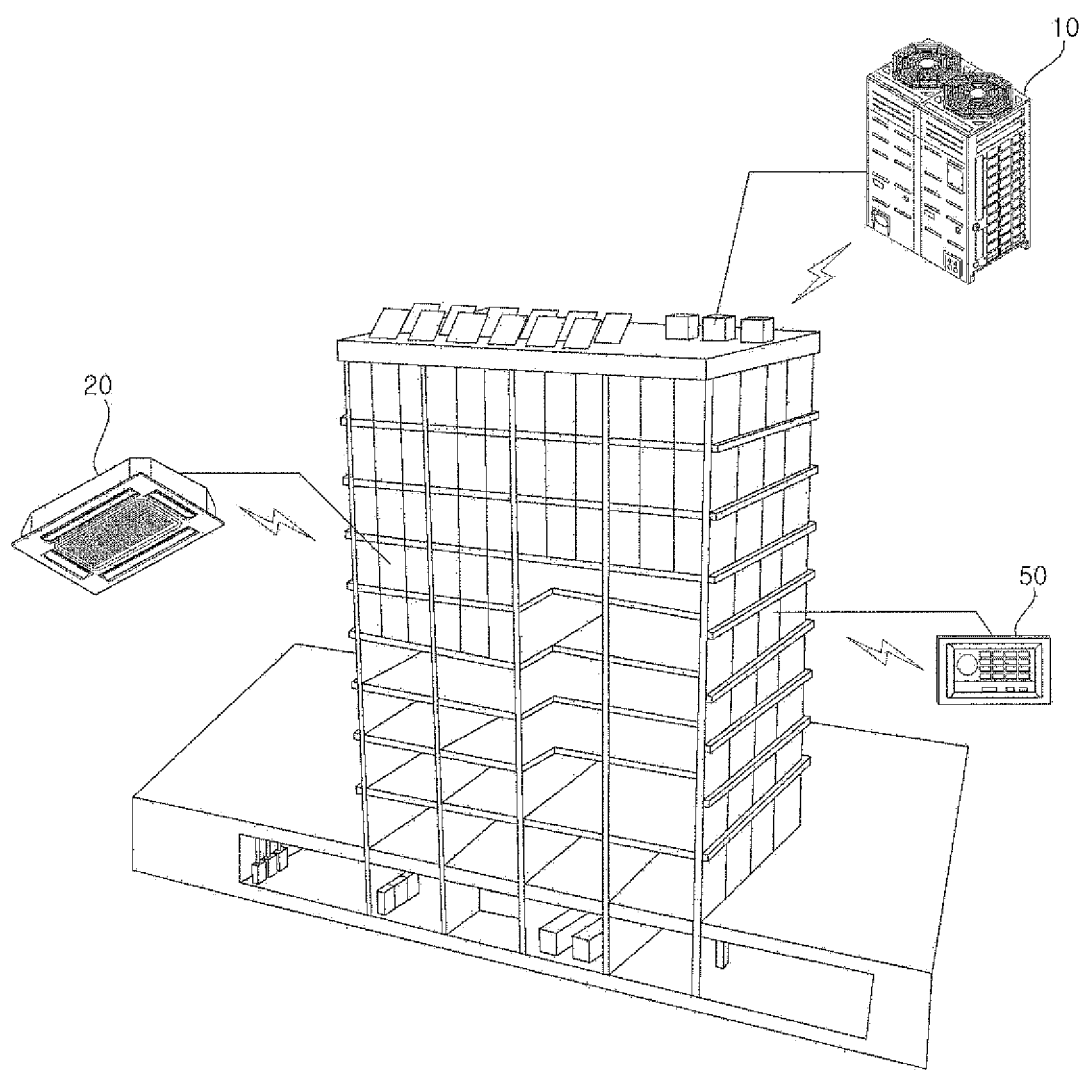
FIG. 1 is a view schematically showing a configuration of an air conditioner installed at a building according to an embodiment.

The advantages, the features, and schemes of achieving the advantages and features of the disclosure will be apparently comprehended by those skilled in the art based on embodiments, which are described hereinafter. However, the embodiments are not limited to following disclosed embodiments but may be implemented in various different forms. The embodiments complete the disclosure to be provided to a person having ordinary skill in the art to which the invention pertains in order to inform a spirit and scope. The embodiments are defined by the scope of claims. Like reference numerals designate like elements throughout the specification. Further, in the embodiments, a configuration of a control unit and each unit may be implemented by one or more processor or by a hardware device.

Embodiments will be described with reference to the accompanying drawings.

FIG. 1 is a view schematically showing a configuration of an air conditioner installed at a building according to an embodiment. As shown in FIG. 1, the air conditioner may include an outdoor unit 10, an indoor unit 20, and a control unit or controller 50. The air conditioner may include a ventilation system, an air cleaner, a humidifier, and a heater as well as the indoor unit and the outdoor unit, and may further include units such as a chiller, an air conditioning unit, and a cooling unit according to scale. In the air conditioner, respective units may be connected with each other to be operated in connection with operations of the indoor unit and the outdoor unit. Further, the air conditioner may be connected with a moving device, a security device, and an alarm device in the building to be operated.

The control unit 50 may control operations of the indoor unit 20 and the outdoor unit 10 corresponding to an input user command, periodically receives and stores corresponding data with respect to operation states of the indoor unit and the outdoor unit, and outputs the operation states through a monitoring screen. The control unit 50 may be connected with the indoor unit 20 to perform operation setting, lock setting, schedule control, group control with respect to the indoor unit, and peak control and demand control with respect to power use.

The outdoor unit 10 may be connected to the indoor unit 20 through a refrigerant pipe to supply a refrigerant to the indoor unit 20. Further, the outdoor unit 10 may periodically communicate with a plurality of indoor units to transmit/receive data from each other, and an operation of the outdoor unit 10 may be changed according to a changed operation setting. The indoor unit 20 may include an electronic expansion valve (not shown) configured to expand a refrigerant supplied from the outdoor unit 10, an indoor heat exchanger (not shown) configured to heat-exchange a refrigerant, an indoor unit fan (not shown) configured to introduce indoor air into the indoor heat exchanger and to expose the heat-exchanged air to an inside, a plurality of sensors (not shown), and a control means (not shown) configured to control an operation of an indoor unit.

Moreover, the indoor unit 20 may include an outlet (not shown) configured to discharge heat-exchanged air, and a wind direction control unit or controller (not shown) may be provided at an outlet to open/close the outlet and to control a direction of the discharged air. The indoor unit may control suctioned air, discharged air, a wind direction by controlling a rotational speed of an indoor unit fan. The indoor unit 20 may further include an input unit or input configured to an operation state and setting information of an indoor unit and an input unit or input configured to input setting data. In this case, the indoor unit 20 may transmit setting information on an operation of the air conditioner to a remote control unit or controller (not shown) which allows the remote control unit to output the setting information and to receive data.

The outdoor unit 10 may be operated in a cooling mode and a heating mode according to data received from the connected indoor unit 20 or a control command from the control unit to supply a refrigerant to a connected indoor unit 20.

When a plurality of outdoor units is connected, outdoor units may be connected to a plurality of indoor units, and may supply the refrigerant to the plurality of indoor units through a distributor.

The outdoor unit 10 may include at least one compressor configured to compress a refrigerant to discharge gaseous refrigerant of high pressure, an accumulator configured to separate gaseous refrigerant and liquid refrigerant from the refrigerant to prevent non-gasified liquid refrigerant from be introduced into the compressor, an oil recovering device configured to recover oil from the refrigerant discharged from the compressor, an outdoor heat exchanger configured to condense or evaporate the refrigerant by heat exchange with an external air, an outdoor fan configured to introduce air into the outdoor heat exchanger and to discharge the heat exchanged air to an outside in order to easily perform heat exchange with the outdoor heat exchanger, a four-way valve configured to change a fluid path of the refrigerant according to an operation mode of the outdoor unit, at least one pressure sensor configured to measure pressure, at least one temperature sensor configured to measure a temperature, and a control configuration configured to control an operation of an outdoor unit and to perform communication with another unit. Although the outdoor unit 10 further may include a plurality of sensors, valves, and sub-coolers, a detailed description thereof is omitted.

Further, the air conditioner may exchange with other air conditioners through a network, such as the Internet. The air conditioner may access an external service center, a management server, and a database through a control unit or controller, and may communicate with an external terminal through a network. A terminal may access the air conditioner to monitor and control an operation of the air conditioner by a second control unit or controller.

Figure 2:
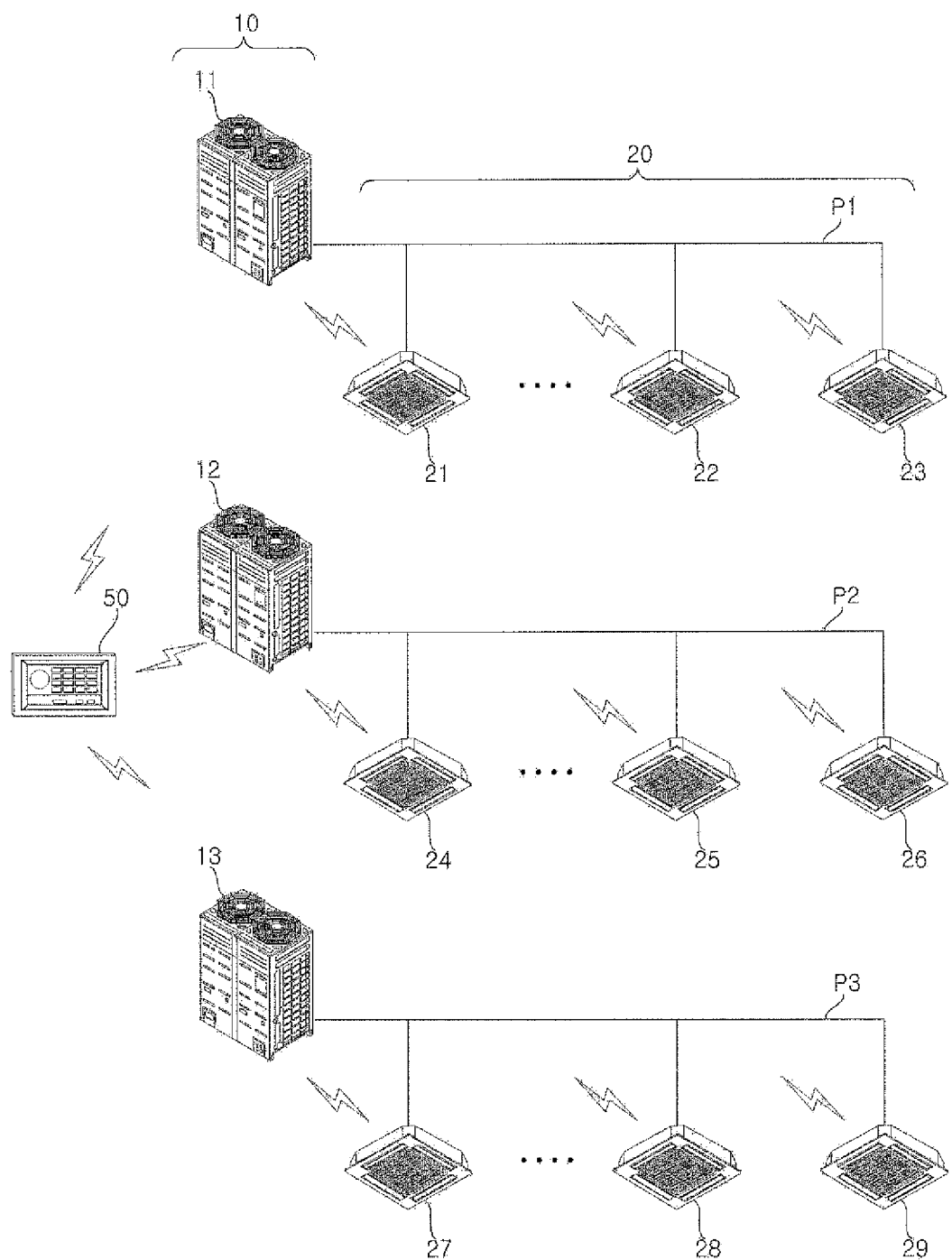
FIG. 2 is a view illustrating a configuration of an air conditioner according to an embodiment.

FIG. 2 is a view illustrating a configuration of an air conditioner according to an embodiment. As shown in FIG. 2, in an air conditioner, a plurality of indoor units 20, a plurality of outdoor units 10, and control unit 50 transmit/receive data in a wireless communication scheme.

The outdoor unit 10 may be connected to a plurality of indoor units through refrigerant pipes P1, P2, and P3 and transmit/receive data in a wireless communication scheme. The outdoor unit 10 may periodically communicate with the plurality of indoor units 20 to transmit/receive data to and from each other, and an operation may be changed according to a changed operation setting from the indoor unit. A plurality of outdoor units and a plurality of indoor units may transmit/receive data in a wireless communication scheme. The indoor unit 20 may communicate with the outdoor unit 10 and communicate with the control unit 50 in a wireless communication scheme.

The outdoor unit 10 may be connected with first to third indoor units 21 to 23 through a first refrigerant pipe P1. The second outdoor unit 12 may be connected with four to sixth indoor units 24 to 26 through a second refrigerant pipe P2. The third outdoor unit 13 may be connected with seventh to ninth indoor units 27 to 29 through a third refrigerant pipe P3. Although this embodiment is described with three indoor units connected with each outdoor unit for the purpose of convenience or clarity and for illustrative purpose only, a number of indoor units or a shape of the indoor unit is not limited.

When the first outdoor unit 10 is operated, the refrigerant is supplied to the first to third indoor units 21 to 23. The refrigerant is supplied to the fourth to sixth indoor units 23 to 26 through the second refrigerant pipe P2 by an operation of the second outdoor unit 12. The refrigerant is supplied to the seventh to ninth indoor units 27 to 29 from the third indoor unit 13 through the third refrigerant unit P3.

In the air conditioner, a group may be configured based on an outdoor unit, and each group may communicate using different channels. As the indoor unit performs heat exchange based on the refrigerant supplied from the outdoor unit to discharge cold and hot air, the indoor unit and the outdoor unit may be configured as one group.

For example, the first outdoor unit 11 may form a first group together with the first to third indoor units 21 to 23 through the first refrigerant pipe P1. The second outdoor 12 may form a second group together with fourth to sixth indoor units 24 to 26 connected with each other through the second refrigerant pipe P2. The third outdoor 13 may form a third group together with seventh to ninth indoor units 24 to 26 connected with each other through the third refrigerant pipe P3. Further, the outdoor and the control unit may be configured according to an installation position. A connection state by the refrigerant pipe may be distinguished based on whether a temperature of an indoor unit is changed according to a supply of a refrigerant of the outdoor unit by operating the outdoor unit and the indoor unit.

The control unit 50 may communicate with the indoor unit 20 or the outdoor unit 10 regardless of a group. The control unit 50 may control operations of the plurality of indoor units 20 and outdoors units 10 according to an input user command, periodically receive and store corresponding data with respect to operation states of the plurality of indoor units and outdoor units, and output the operation states on a monitor screen.

The control unit 50 may be connected to the plurality of indoor unit 20 to perform, for example, operating setting, lock setting, schedule control, group control, and group control with respect to the indoor unit, and peak control and demand control with respect to power use. Further, the control unit 50 may communicate with the outdoor unit to control an outer unit and to monitor an operation of the outdoor unit.

Furthermore, when a plurality of control unit is provided, the control units 50 may transmit/receive data through a wireless communication, and may connect with an external control unit or controller through an external network. When the control unit 50 and the plurality of units transmit/receive the data in a wireless communication scheme, addresses for communication may be stored in the control unit and the plurality of units. Each address may be assigned by the outdoor and the control unit.

As described above, the outdoor unit may be configured in a group with an indoor unit connected by the refrigerant pipe. In this case, an address may be assigned to an indoor unit included in the same group including the outdoor unit. Further, although a group is configured based on the outdoor unit, all outdoor units may communicate with all indoor units. Accordingly, the control unit may assign an address for central control as well as address for communication in a group unit to a plurality of units. In some cases, without assigning a separate address, an address assigned to the outdoor and the indoor unit may be used as the address for central control.

Figure 3A:
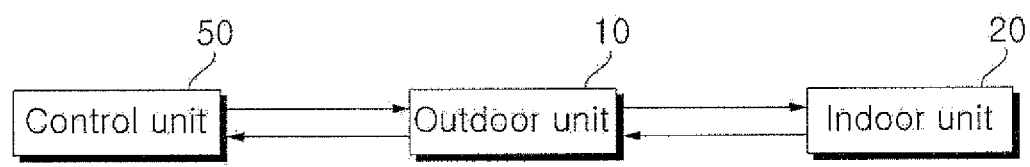
FIGS. 3A-3B are a block diagrams illustrating communication between units of the air conditioner according to an embodiment.
Figure 3B:
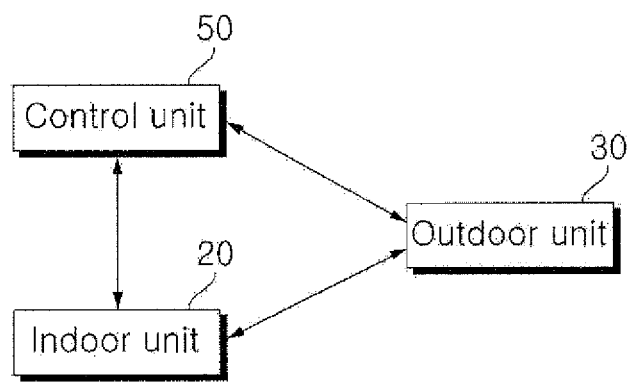

FIGS. 3A-3B are block diagrams illustrating communication between units of the air conditioner according to an embodiment. FIG. 3A is a block diagram illustrating communication between units using wireless communication. FIG. 3B is a block diagram illustrating communication between units using wireless communication.

As shown in FIG. 3A, in the air conditioner, a plurality of units is connected with each other by a communication line. As there is a limitation in connection of the communication line in the plurality of units, the plurality of units is not connected in a one-to-one correspondence but is sequentially connected according to a connection form of the communication line.

The plurality of indoor units may be connected with one outdoor unit through the communication line, and the outdoor unit may be connected with the control unit 50. When a plurality of outdoor units is provided, a plurality of indoor units may be connected with the outdoor unit based on a connection state of the refrigerant pipe. The plurality of outdoor units may be connected with the control unit 50.

The indoor unit 20 may transmit data to the outdoor unit 10, and the outdoor unit 10 may transmit outdoor unit data to and received indoor unit data from the control unit 50. The control unit 50 may confirm an operation state of the indoor unit 20 based on received data. When the control unit 50 transfers a control command to the indoor unit 20, the control unit 50 may transmit a control command to an outdoor unit 10 connected with a corresponding indoor unit 20, and the outdoor unit 10 may transmit the received control command to a corresponding indoor unit 20.

As described above, in a case of communication using wired communication, the plurality of units may not be connected with each other in one-to-one correspondence but data may be sequentially transmitted according to a connection state of the communication line. Accordingly, as data of the indoor unit is not directly transmitted, there may be a time delay to transmit the data. Further, as the outdoor unit should process unit data different from the outdoor unit data, a load is increased. As one outdoor unit should process data of the plurality of indoor units, it takes a long time to transmit data according to the number of connected indoor units.

As shown in FIG. 3B, the outdoor unit 10, the indoor unit 20, and the control unit 50 may transmit/receive data in a wireless communication scheme. The control unit 50 may make a request to the outdoor unit 10 and the indoor unit 20, and determine an operation state of each unit based on the data received from the outdoor unit 10 and the indoor unit 20 to determine a presence of failure.

As described above, the previous embodiment has described that a group is configured between the outdoor unit and an indoor unit by taking into consideration a flow of the refrigerant. Not only a communication channel between the outdoor unit and the indoor unit but also a communication channel including the control unit, the outdoor unit, and the indoor unit may be separately configured.

The control unit 50 may change an operation setting of the indoor unit 20 according to a state (temperature or humidity) of an indoor space in which the indoor unit 20 is installed based on the data received from the indoor unit 20, and directly transmit data according to an operation setting change to the indoor unit 20. In this case, when the operation setting of the indoor unit 20 is changed, the control unit 50 may transmit corresponding data to the outdoor unit 10 and accordingly change an operation of the outdoor unit 10.

When a schedule is set so that the indoor unit 20 performs a preset or predetermined operation at a designated time, the control unit 50 may transmit an operation command to the indoor unit 20 and an outdoor unit 10 connected with the indoor unit 20. The indoor unit 20 may transmit a corresponding response to the control unit 50 and transmit data with respect to an operation state at a predetermined time interval. The indoor unit 20 may set an operation to transmit data to the outdoor unit 10 according to data received from the input unit or data received from the control unit 50. The outdoor unit 10 may calculate the received data of the indoor unit 20 and a load according to an operation state of a plurality of indoor units to control a compressor. The outdoor unit 10 or the indoor unit 20 may transmit data to the control unit 50 at a predetermined time interval. When breakage or failure occurs, the outdoor unit 10 or the indoor unit 20 may transmit data with respect to the breakage or the failure.

Figure 4:
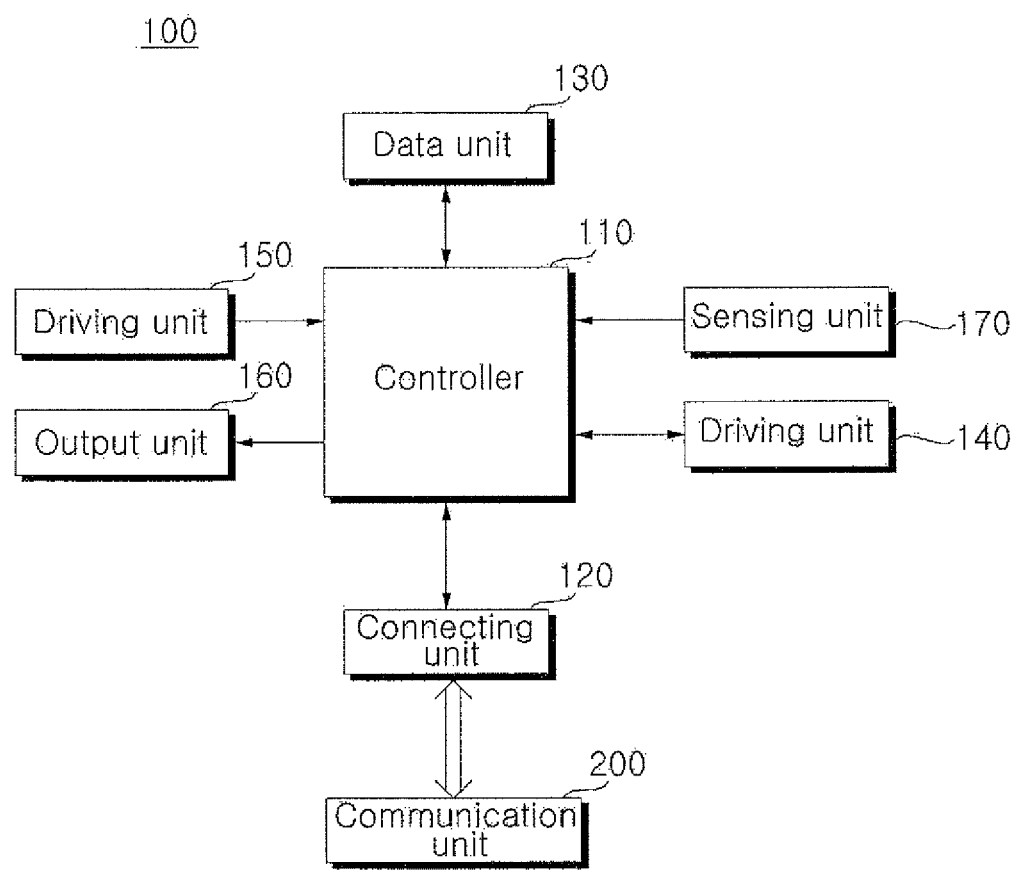
FIG. 4 is a block diagram schematically illustrating a control configuration of units of the air conditioner according to an embodiment.

FIG. 4 is a block diagram schematically illustrating a control configuration of units of the air conditioner according to an embodiment. As shown in FIG. 4, a unit of the air conditioner may include a drive unit or drive 140, a sensing unit or sensor 170, a communication unit 120, an output unit or output 160, an input unit or input 150, a data unit or storage 130, a connecting unit 120, and a controller 110 configured to control an overall operation. Moreover, the unit 100 may be connected with a communication unit 200. The communication unit 200 may be installed at an inside or outside of the unit 100.

The above is a configuration included in each unit 100 in common and a separate configuration may be added according to a characteristic of a product. For example, the outdoor unit 10 may include a compressor, an outdoor unit fan, and a plurality of valves. Accordingly, the drive unit of the outdoor unit may include a compressor driver, an outdoor fan driver, and a valve controller.

The indoor unit 20 may include a louver or a vane as a wind direction controller. The indoor unit 20 may include an indoor unit and a plurality of valves, and may further include an indoor unit fan driver, a valve controller, and a wind direction controller. Further, according to a type of the unit, types, a number, and installation positions of a sensor included in the sensing unit 170 may be changed.

The data unit 130 may store, for example, control data for controlling an operation of the unit 100, communication data with respect to an address or group setting for communicating with another unit, data transmitted/received to/from the outside, and operation data generated or sensed during the operation. The data unit 130 may store an execution program by function of the unit, data for controlling the operation, and transmitted/received data. The data unit 130 may include various storage devices, such as ROM, RAM, EPROM, a flash driver, and a hard driver in a hardware scheme, for example.

The input unit 150 may include at least one of buttons, switches, or a touch input means, for example. When a user command or predetermined data corresponding to operation of an input means is input to the input unit 150, the input unit 150 may provide the input data to the controller 110. A power key, a trial run key, and an address setting key may be provided in the outdoor unit, for example. A power key, a menu input key, an operation setting key, a temperature control key, a wind direction key, and a lock key, for example, may be provided in the indoor unit.

The output unit 160 may include at least one of a lamp lighting or blinking of which is controlled, a speaker, and a display to output an operation state of the unit. The lamp may output whether a unit is operated according to a presence of lighting, a lighting color, and a presence of blinking. The speaker may output a predetermined warning sound and a sound effect to output an operation state. The display may output a menu screen for controlling a unit, and may output an operation setting or an operation state of the unit with a guide message or warning configured by at least one combination of characters, numbers, and images.

The sensing unit 170 may include a plurality of sensors. The sensing unit 170 may include a pressure sensor, a temperature sensor, a gas sensor, a humidity sensor, and a flow sensor, for example.

For example, a plurality of temperature sensors may be provided and detect and input an indoor temperature, an outdoor temperature, an indoor heat exchanger temperature, an outdoor heat exchanger, and a pipe temperature to the controller 110, for example. The pressure sensors may be installed at an input port and an output port of the refrigerant pipe to measure and input pressure of an introduced refrigerant and pressure of a discharged refrigerant to the controller 110. The pressure sensor may be installed at a water pipe as well as the refrigerant pipe.

The drive unit 140 may supply operation power to a control target according to a control command from the controller 110 to control drive of the control target. As described above, in a case of the outdoor unit, the drive unit 140 may separately include, for example, a compressor driver, an outdoor fan driver, and a valve controller configured to control a compressor, an outdoor fan, and a valve, respectively. The drive unit 140 may provide an operation power to motors included in a compressor, an outdoor unit fan, and a valve which allows the compressor, the outdoor unit fan, and the valve to perform a designated operation according to operation of the motors.

The communication unit 200 may include at least one wireless communication module to communicate with another unit according to a control command from the controller 110. The communication unit 200 may transmit/receive data between the controller 110, the outdoor unit, and the indoor unit in a wireless communication scheme and provide received data to the controller 110.

The communication unit 200 may store information on an upper parent node and a lower child node in an air conditioner network. The communication unit 200 may confirm and transfer data received from the parent node to the child node, and confirm and transmit data received from the child node to the parent node. In this case, the communication unit 200 may transmit data except for the data with respect to the parent node and the child node in a broadcast scheme, and may transmit data of the parent node and the child not in a unicast scheme.

The controller 110 may control data input and output through the input unit 150 and the output unit 160, manage data stored in the data unit 130, and controls transmission/reception of the data through the communication unit 120. The controller 110 may detect a connection state and a communication state of the communication unit 200 through the connecting unit 120 to determine failure.

The controller 110 may generate a control command according to a request from another unit or operation setting to provide the control command to the driving unit 140. Accordingly, the drive unit 140 may allow connected configurations, for example, a compressor, an outdoor fan, valves, an indoor unit fan, and a wind direction controller to be operated. Further, the controller 110 may determine an operation state according to data input from a plurality of sensors of the sensing unit 170 to determine a presence of failure and to output an error.

The communication unit 200 may communicate using a frequency of sub-giga (GHz) band having excellent transmission and diffraction characteristics by taking into consideration an attenuation effect of a wireless signal due to a wall in a building and an inter-layer obstacle. The communication unit 200 may communicate using one of a 400 MHz band or a 900 MHz band which are unlicensed bands available for a specific small-power radio station. The communication unit 120 may selectively use a 400 MHz band frequency and a 900 MHz band frequency corresponding to different rules according to a zone or a country. Further, the communication unit 200 may further include a short range communication module such as a ZigBee module, a Bluetooth module, and a Near Field Communication (NFC) module, for example.

The communication unit 200 may be connected with the unit 100 through the connection unit 120. The communication unit 200 may receive and transmit data of the unit through the connecting unit 120 and provide the received data to the unit.

The communication unit 200 may communicate using a frequency of sub-giga (GHz) band to allow communication through walls, bottoms or floors, and obstacles in the building. As the sub-giga (GHz) band frequency has excellent transmission and diffraction characteristics, an attenuation effect due to walls or an inter-layer obstacle is low.

The communication unit 200 may communicate using one of a 400 MHz band or a 900 MHz band, which are unlicensed bands available for a specific small-power radio station among sub-giga bands. The communication unit 200 may selectively use a 400 MHz band frequency or a 900 MHz band frequency corresponding to different rules according to a zone or a country. Further, the communication unit 200 may further include a short range communication module, such as a ZigBee module, a Bluetooth module, and a Near Field Communication (NFC) module, for example.

The communication unit 200 may include a plurality of communication modules to communicate with or between the outdoor unit and another indoor unit, between the outdoor unit and a remote controller, and between the outdoor unit and the controller 110 through the same or different communication modules. The communication unit 200 may communicate in different communication schemes according to a target by selectively changing a communication scheme corresponding to a communicating target. When a different channel is used in communication with the indoor unit and the control unit 50, the communication unit 200 may configure a channel according to the communicating target to transmit/receive data.

According to Korean radio regulations, with respect to the 400 MHz frequency band or the 900 MHz frequency band, there are 21 channels from 424.7 MHz to 424.95 MHz and 11 channels from 447.8625 MHz to 447.9875 MHz for wireless devices for a small output radio station and 32 channels from 917 MHz to 923.5 MHz for wireless devices such as RFID/USN, so that the air conditioner may communicate using the above channels. Unlicensed frequency bands by country will be described.

The unlicensed frequency bands at North America or South America may include 902 MHz to 928 MHz (FCC Part 15.247). The unlicensed frequency bands at Europe may include 433 MHz, 915 MHz, and 863 MHz to 868 MHz (ETSIEN300220). The unlicensed frequency bands at Japan may include 920 MHz to 928 MHz (ARIB STD-T108). The unlicensed frequency bands at China may include 920 MHz. The unlicensed frequency bands at Korea may include 424 MHz to 447 MHz, and 917 MHz to 923.5 MHz (KC). The unlicensed frequency bands at India may include 867 MHz (G.S.R 564(E)). The unlicensed frequency bands at Australia may include 433, 915 MHz. The unlicensed frequency bands at South Africa may include 433 MHz and 915 MHz.

The unlicensed frequency bands at the world may include 2.4 GHz and 5.725 GHz in common.

When the North America or the South America uses 902 MHz to 928 MHz (FCC Part 15.247), the Europe uses 433 MHz, 915 MHz, and 863 MHz to 868 MHz (ETSIEN300220), the Japan uses 920 MHz to 928 MHz (ARIB STD-T108), the Korea uses 424 MHz to 447 MHz, and 917 MHz to 923.5 MHz (KC), the India uses 867 MHz (G.S.R 564(E)), and the world uses 2.4 GHz and 5.725 GHz in common, communication is possible at transmission speed greater than 50 kbps.

Figure 5:
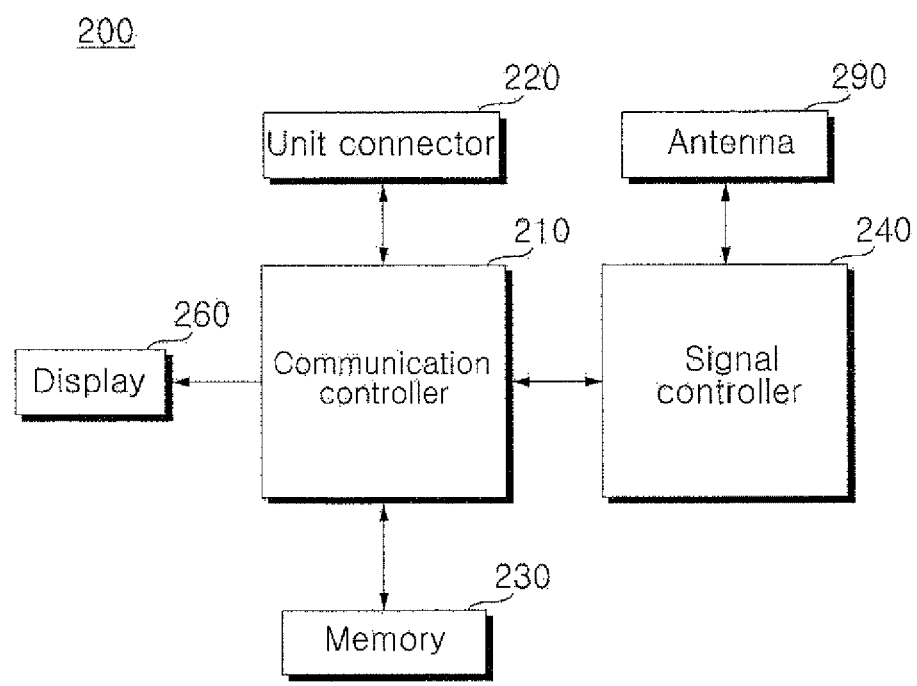
FIG. 5 is a block diagram schematically illustrating a configuration of a communication unit for wireless communication in an air conditioner according to an embodiment.

FIG. 5 is a block diagram schematically illustrating a configuration of a communication unit for wireless communication in an air conditioner according to an embodiment. As shown in FIG. 5, the communication unit 200 may include an antenna 290, a signal controller 240, a memory 230, a display 260, a unit connector 220, and a communication controller 210 configured to control an overall operation.

As there are obstacles such as an inter-layer wall or furniture, there is a need to use a frequency band which may pass through the obstacles in a building and reach greater than a predetermined distance. Accordingly, the communication unit 200 may communicate using a 400 MHz band frequency or a 900 MHz band frequency.

The antenna 290 may selectively use a 400 MHz band or a 900 MHz band of the sub-giga bands according to a used frequency band. A shape and size of the antenna 290 may be changed according to the used frequency band.

For example, a length of the antenna may be $\lambda/2$ or $\lambda/4$ of a transmission frequency. Accordingly, when the transmission frequency is 447 MHz, a wavelength of the antenna may be 0.67 m. If $\lambda/2$ is applied to the transmission frequency, the length of the antenna may be 0.34 m. If $\lambda/4$ is applied to the transmission frequency, the length of the antenna may be 0.17 m.

A case of ISM bands (100 MHz, 200 MHz, 400 MHz, 900 MHz) among the sub-giga bands has an excellent transmission characteristic in a building so that inter-layer communication is possible. As the length of the antenna 290 is determined according to a band of a transmission frequency, an antenna is long in a case of a 100 MHz band or a 200 MHz band so that there is a limitation in installation. The communication unit may communicate using a 400 MHz frequency band or a 900 MHz frequency band among the above frequency bands by taking into consideration inter-layer communication and length of the antenna.

The antenna 290 may transmit a signal output from the signal controller 240 in air and receive and provide a signal of a frequency band designated in air the signal controller 240. Even if the communication unit is mounted inside the unit 100, the antenna 290 may be installed at an outside of the unit 100. The unit of the air condition may include an external antenna rather than a built-in antenna in order to transmit/receive a wireless signal because there is a plurality of cases made of iron. Further, as an installation position of the unit 100 is not fixed but the unit 100 may be installed at various positions, the antenna 290 may use an omnidirectional antenna.

The signal controller 240 may convert transmitted/received data according to a reception target or a used communication scheme. Further, the signal controller 240 may manage and control transmission and reception of a signal through the antenna. The signal controller 240 may control output of a signal by controlling impedance of the antenna 290 to have a preset or predetermined value. The signal controller 240 may control impedance suited to a frequency band of a signal to be transmitted/received through the antenna 290. As the communication unit 200 uses a sub-giga band of a 400 band or a 900 MHz band, the signal controller 240 may perform impedance matching according to a used frequency band.

The unit connector 220 may be electrically connected to the connecting unit 120 to connect the communication unit 200 with the unit 100. The unit connector 220 may include a connection terminal coupled with the connecting unit 120 included in the unit 100. Each shape of the unit connector 220 and the connecting unit 120 may be changed when the communication unit 200 is provided at an outside of the unit 100 and is provided at an inside thereof.

The unit connector 220 may provide a signal received from the unit 100 to the communication controller 210, and provide a signal of the communication unit 200 to the connecting unit 120 to be transferred to the controller 110. The communication controller 210 may control the signal controller 240 to transmit a signal of a designated frequency band as an output in which data of the unit is set. Moreover, the communication controller 210 may process and provide the received data to the unit. In addition, the communication controller 210 may control data to be converted into a designated form according to a used communication scheme.

The communication controller 210 may confirm a communication state of a connected network and determine whether communication is possible to output a determination result through the display 260. When communication fails, the communication controller 210 may allow the display 260 to output a corresponding warning. Moreover, the communication controller 210 may transmit communication failure to the unit through the unit connector 220.

The communication controller 210 may periodically exchange a signal with the unit 100 to receive and store data from the unit 100. When there is a request from another unit, the communication controller 210 may generate and transmit a response based on the stored data. If necessary, the communication controller 210 may request data to the unit 100.

The communication controller 210 may store information on the upper parent node and the lower child node. In a case of a master unit among a plurality of units, the communication controller 210 may store information on all units in a routing table. In a slave unit except for the master unit, the communication controller 210 may store only information on the parent node and the child node without a routing table.

As the communication unit 200 communicates using a sub-giga band frequency due to interlayer communication so that a network bandwidth is small due to a problem of a frequency band, there is a need to minimize network traffic. Accordingly, as each node does not include a routing table and stores only the parent node and the child node so that each node processes only traffic with respect to the parent node and the child node, the communication controller 210 may reduce traffic of the network and calculation load of each node.

The communication controller 210 may confirm whether received data is data of a connected unit, and transmit data in a broadcast scheme or a unicast scheme according to a target unit. The communication controller 210 may confirm and transmit data received form the parent node to the child nod, and data received from the child node to the parent node.

When a reception target of the data is the parent node or the child node, the communication controller 210 may transmit the data to the parent node or the child node in the unicast scheme. When the reception target of the data is the parent node and the child node, the communication controller 210 may transmit the data in the broadcast scheme. Although a reception target is not the parent node, the communication controller 210 may transmit data received from the child node to the parent node in the unicast scheme.

When a communication channel is set in communication between units, the communication controller 210 may control the data to be transmitted through a designated channel. When the communication controller 210 transmits data to a specific target according to a request from a unit 100, the communication controller 210 may confirm an address of a corresponding unit to convert data so that the data is transmitted to a designated unit through an antenna.

Further, the communication controller 210 may confirm whether received data is data of the unit to transfer the data to another unit or the unit so that another unit or the unit processes. Before transferring the data to the unit, the communication controller 210 may convert the data into a processable form of the unit to transmit the converted data. The display 260 may output an operation state, a network connection state, and a transmission/reception state of the data of the communication unit 200.

Figure 6:
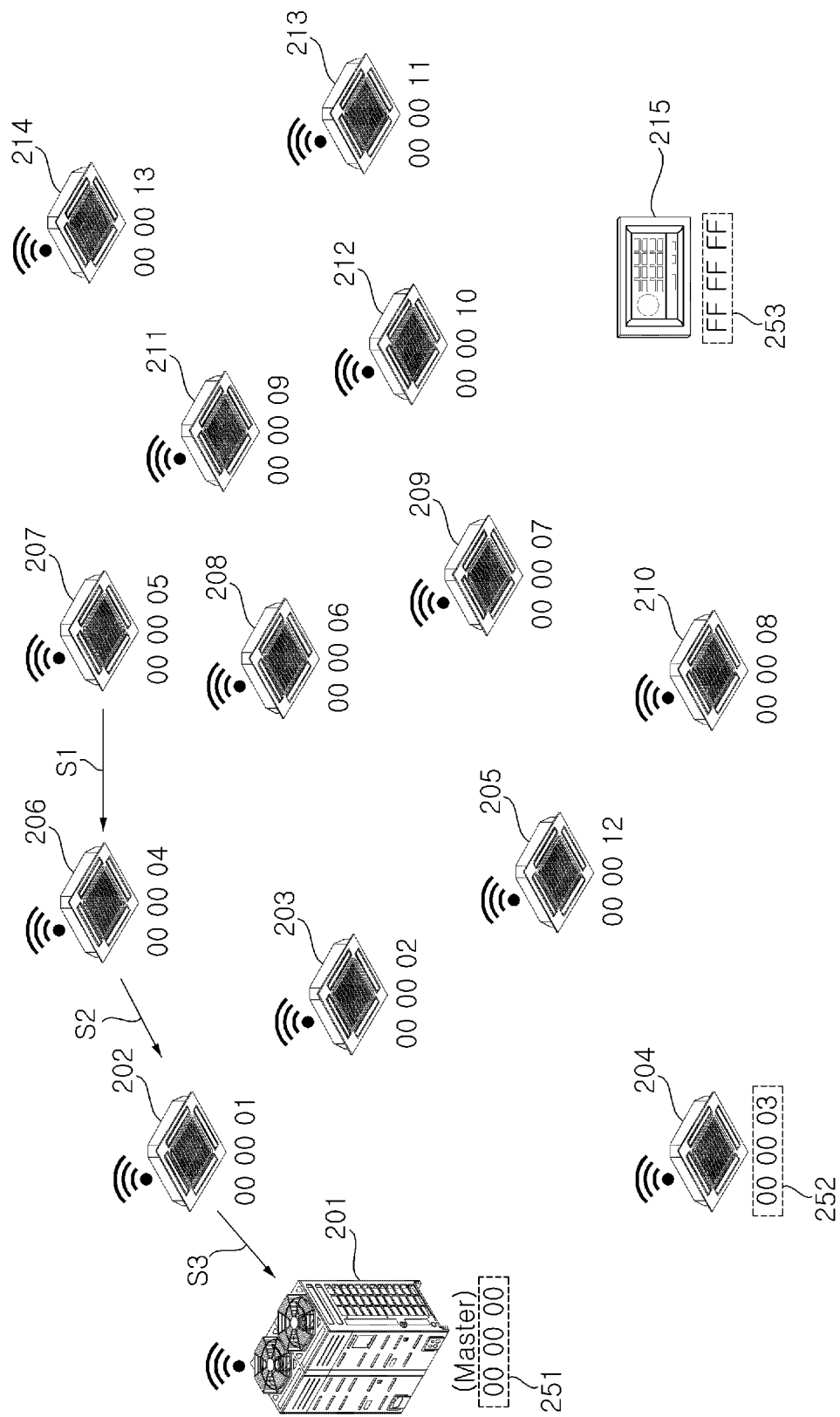
FIG. 6 is a diagram illustrating a process of transferring data between units of an air conditioner according to an embodiment.

FIG. 6 is a diagram illustrating a process of transferring data between units of an air conditioner according to an embodiment. As shown in FIG. 6, a plurality of units may communicate in a wireless scheme using a sub-giga (Sub-GHz) band frequency.

If a frequency band is reduced, an available bandwidth may be reduced. If the frequency band is increased, an available bandwidth may be increased. When the sub-giga band is used, the frequency band may be low so that a bandwidth becomes narrower. Accordingly, when a routing scheme, such as 2.4G ZigBee (250 Kbps) is applied, a signal is delayed due to increase of traffic. As traffic occurs when the routing table is replaced, each node cannot process the signal.

Accordingly, embodiments disclosed herein restrictively use routing information stored in each node in a specific node in order to reduce traffic of a network. Each unit is operated as one node, and one of a plurality of units is configured as a master node. For example, in the following description, a first outdoor unit 201 may be a master node and remaining units 202 to 214 may be a slave node. The indoor units 202 to 214 or the controller 215 may be configured as a master node. However, as the indoor unit is connected with the outdoor unit through a refrigerant pipe to be operated in connection with each other, the outdoor unit or the control unit 50 may be configured as a master.

The master node may store a routing table including information on all nodes, and the slave node may store only information on the parent node and the child node in the routing table. Further, when a plurality of nodes replaces the routing table, the nodes may replace only information on the parent node. Accordingly, the child node may perform only routing with respect to the parent node and the child node to reduce traffic.

The first outdoor unit 201 may be configured as a master node, and first to thirteenth indoor units 202 to 214 may be configured as a slave node being first to thirteenth nodes. The controller 215 may be configured as master or slave. The master node always becomes the uppermost node.

An address is set to each node.

An address of 00 00 00(251) is set to the first outdoor unit 201 being a master node. An address of 00 00 03(252) is set to the fourth indoor unit. An address of FF FF FF (253) may be set to the controller 215.

An address of an indoor unit being a slave node may be set according to an address of a connected outdoor unit. For example, as the address of the first outdoor unit 201 is 00 00 00, an address of 00 00 01 to 00 00 13 may be set to the indoor unit. When the address of the second outdoor unit is 00 01 00, an address of 00 01 01 to 00 01 13 may be set to the indoor unit connected with the second outdoor unit.

A plurality of indoor units may not be installed at one indoor zone but distributed at a plurality of indoor zones, and may not be installed at one layer or level or floors but may be installed at a plurality of layers. Accordingly, each indoor unit may transfer a signal of another unit as an intermediate node. A node located beyond a reach distance of a frequency signal at a sub-giga band receives signals from another node.

The slave node may transmit data received from the parent node to the childe node, and transmit all data received from the child node to the parent node. However, when a reception target of the data is the slave node, the slave node may generate and transmit a response to the parent node.

The first indoor unit 201 being the master node may communicate with the third indoor unit 207 as follows.

A parent node of the third indoor unit 207 may be the second indoor unit 206, and a parent node of the second indoor unit 206 may be the first indoor unit 202. The parent node of the first indoor unit 202 may be the first outdoor unit 201 being a master node, and a second indoor unit 206 may be the child node. The childe node of the second indoor unit may be the third indoor unit 207.

When the first outdoor unit 201 being the master node transmits data to the third indoor unit 207, the first outdoor unit 201 may transmit data to the third outdoor unit 207 based on the stored routing table.

The first outdoor unit 201 may transmit data to the first outdoor unit 201 based on a hierarchy structure of a network table. The first outdoor unit 201 may receive data from the first indoor unit being a parent node and confirm whether the received data is data of the first outdoor unit 201 to transmit the data to the second indoor unit 206 being a child node. The second indoor unit 206 may confirm whether the received data is data of the second indoor unit 206 to transmit the data to the third indoor unit 207 being the child node.

The third indoor unit 207 may confirm data of the third indoor unit 207 to change operation setting or operation. The third indoor unit 307 may generate response data to transmit the response data to the second indoor unit 206 being the parent node.

The second indoor unit 206 may transmit received data to the first indoor unit 202 being a parent node, and the first indoor unit 202 may transmit data to the first outdoor unit 201 being a parent node. Each node may transmit data received from the childe node to the parent node so that data is transferred to the first outdoor unit being a master node.

When the second indoor unit 206 fails to stop or communication is impossible, although the third indoor unit 207 transmits the data, the second indoor unit cannot receive the data. When the second indoor unit 206 is operating, if data is not received for a predetermined time or longer, the second indoor unit 206 may automatically turn-off the power to be again driven.

After the second indoor unit 206 restarts, if a normal operation is possible, the second indoor unit 206 may receive and transmit data of the third indoor unit to the first indoor unit. However, after the second indoor unit 206 restarts, if the second indoor unit 206 is not normally operated, the second indoor unit 206 may output an error. Further, in a case where an operation of the second indoor unit is impossible so that power is turned-off, if the first indoor unit 202 does not receive the data from the second indoor unit for a predetermined time, the first indoor unit 202 may output a communication error.

The master node may determine a failure occurring position based on the communication error. When the first indoor unit does not receive data from the second indoor unit in a normal operation state and the third indoor unit is normally operated, the master node may determine that the second indoor unit fails.

When a communication error occurs, the master node or the slave node may retransmit the data after a predetermined time has elapsed or may transmit data in a normal communication state. When transmission of the data fails, as each node stores only information on the parent node and the child node in a routing table, it is impossible to search another path. Accordingly, each node processes that transmission of corresponding data fails to output an error. The node with the error restarts. If the node is normally operated after restart, the node again requests or transmits the data.

The plurality of nodes may periodically exchange signals with the parent node or the child node. When the signals are not exchanged for a predetermined time or longer, the plurality of nodes may determine that the parent node or the child node fails to output an error.

Figure 7A:
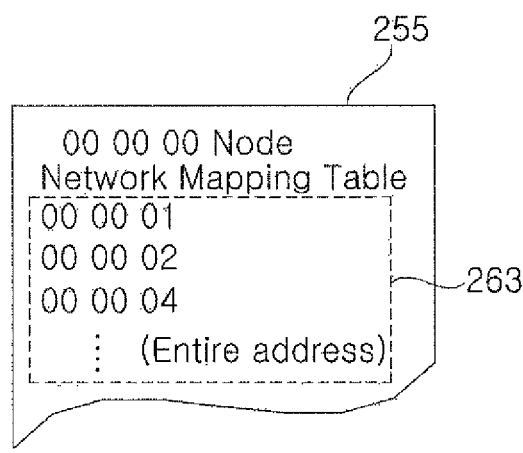
FIGS. 7A-7C are diagrams illustrating network information stored in a unit for wireless communication of an air conditioner according to an embodiment.
Figure 7B:
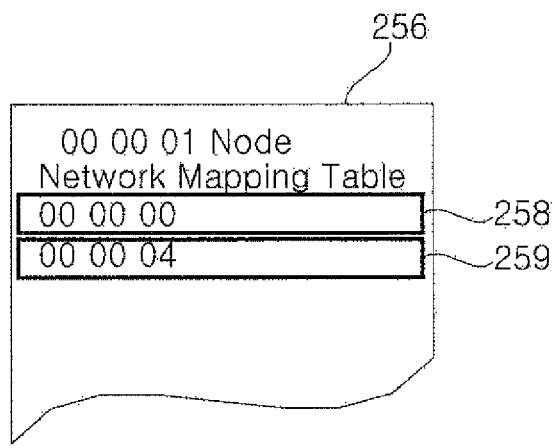
Figure 7C:
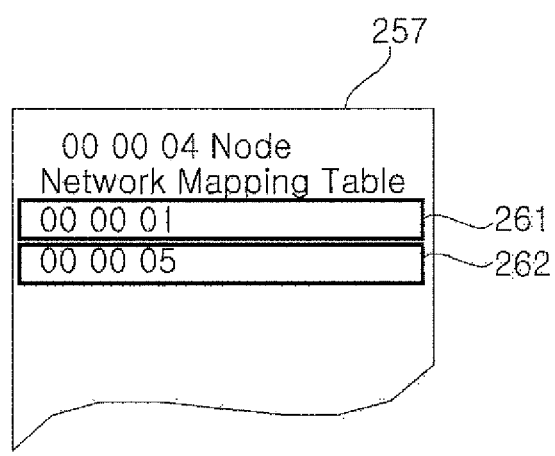

FIGS. 7A-7C are diagrams illustrating network information stored in a unit for wireless communication of an air conditioner according to an embodiment. As shown in FIG. 7, each node may include a routing table.

As shown in FIG. 7A, a routing table 255 with respect to all nodes may be stored in the first outdoor unit 201 being the master node. The routing table 255 may include an entire address 263 with respect to the lower slave node. As shown in FIGS. 7B and 7C, the slave node may store a routing table including addresses of the parent node and the child node.

The first indoor unit 202 may store an address 258 of a first outdoor unit being a parent node and an address 259 of a second indoor unit being a child node. The second indoor unit may store an address 261 of a first indoor unit being a parent node, and an address 262 of a third indoor unit being a child node.

The first indoor unit may store an address 00 00 00 of the first outdoor unit and an address 00 00 04 of the second indoor unit. The second indoor unit may store an address 00 00 01 of the first indoor unit and an address 00 00 05 of the third indoor unit.

In the air conditioner, in order to perform wireless communication in a building, there is a need to use a wireless communication protocol of a Sub-GHz hand and a routing algorithm. Embodiments disclosed herein use a combination of a ZigBee type routing algorithm and Sub-GHz. The embodiments may use a combination of one of a distance vector algorithm, a link state algorithm, and a complex scheme, for example, and the sub-gigs band.

The above routing algorithm is as follows.

A distance vector algorithm for searching adjacent devices rarely uses a memory, has a high transmission success rate through routing, and easily searches another device upon path loss. However, communication traffic is high, and when a band width is insufficient, there is a limitation in transmitting/receiving data.

An address system based link state algorithm allows rapid response through an optimal path, may minimize use of a band width, and have a high transmission success rate. However, the address system based link state algorithm frequently uses a memory, and has a difficulty in finding another path upon path loss.

Accordingly, a complex scheme combining the above algorithms with each other has an average use rate of a memory and easily searches another path upon the path loss but has a low transmission success rate.

Figure 8:
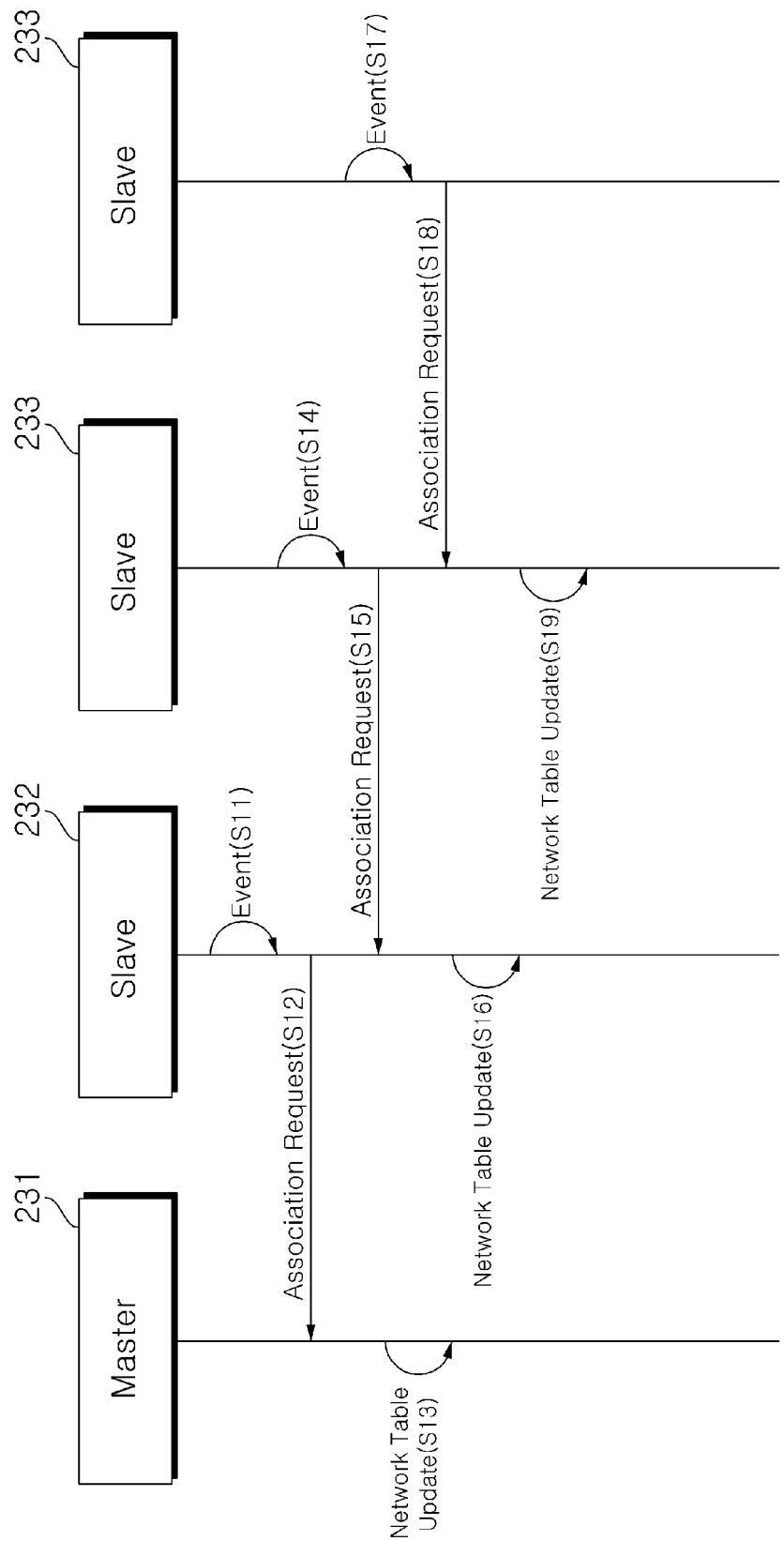
FIG. 8 is a scheme diagram illustrating a data transmission flow of a master node and a slave node in wireless communication of the air conditioner according to an embodiment.

FIG. 8 is a scheme diagram illustrating a data transmission flow of a master node and a slave node in wireless communication of the air conditioner according to an embodiment. A plurality of nodes receives only information on the parent node when performing network association for exchange of a routing table. The master node includes an entire network table with respect to all nodes.

When the master node transmits data to the slave node, the data is transmitted to a communication target. However, the slave node transmits the data to the master node, in an unicast scheme. If each node repeats to transmit the data to the parent node, the data is finally transmitted to the master node.

As shown in FIG. 8, a master node 231 exchanges data with a plurality of slave nodes 232 to 234. The master node may be a first outdoor unit and a plurality of indoor units may be a slave node.

The master node may be a final parent node, a first slave node may use a master node as a parent node, and a child node may be a second slave node. Further, the second slave node may use a first slave node as a parent node, and a third slave node may be a child node.

When an event is generated in a first slave node (S11), the first slave node 232 may send an association request to a master node being a parent node (S12). A master node 231 may update a network table according to the association request (S13).

When an event is generated in a second slave node 233 (S14), the second slave node 233 may send an association request to a first slave node 232 being a parent node (S15). Accordingly, the first master node may update a network table (S16).

Further, when an event is generated in a third slave node 234 (S17), the third slave node 234 may send an association request to a second slave node 233 being a parent node (S17). Accordingly, the second master node may update a network table (S19).

Accordingly, respective network routing tables may be updated.

Figure 9:
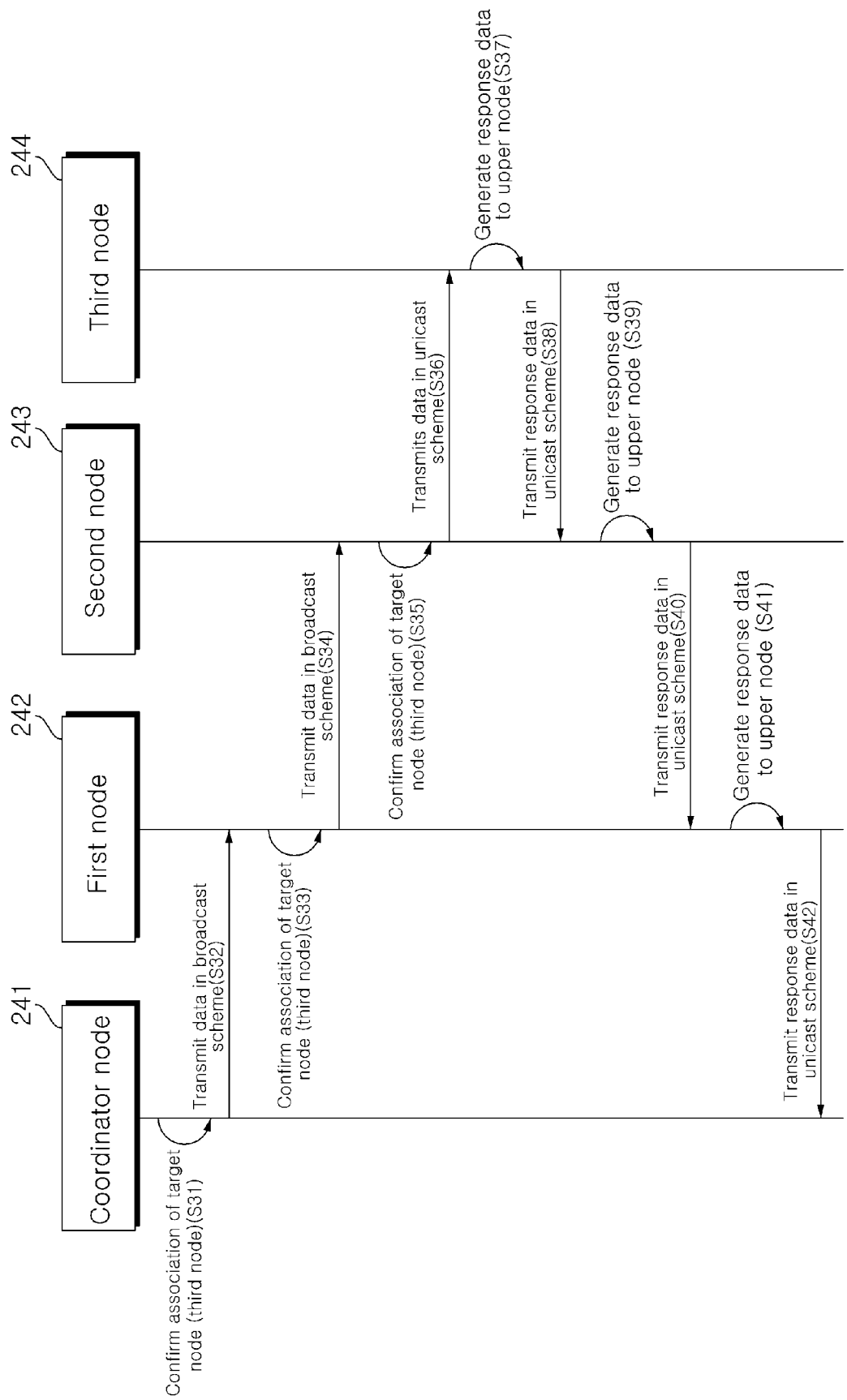
FIG. 9 is a scheme diagram illustrating a data transmission flow of a plurality of nodes in wireless communication of the air conditioner according to an embodiment.

FIG. 9 is a scheme diagram illustrating a data transmission flow of a plurality of nodes in wireless communication of the air conditioner according to an embodiment. Among routing schemes, a ZigBee routing scheme, data is transmitted as follows.

A used amount of a memory according to routing is small. Each node may include only information on peripheral nodes to which a signal reaches. However, upon traffic response in order to search a path, a data size may be increased.

For example, when a coordinator node of a network exchanges data with a third node, the coordinator node may confirm association with a third node being a target. When there is no association, the coordinator may transmit the data to a first node in a broadcast scheme. The first node may determine whether the third node is directly associated with the first node. The first node may add an address of the first node to a routing field to transmit the routing field to the second node in a broadcast scheme. Further, the second node may determine whether the third node is directly associated with the second node. The second node may add an address of the second node to the routing field to transmit the routing field to the third node. In this case, as the second node is associated with the third node, the second node may transmit data in a unicast scheme.

The third node may confirm a routing field of received data, that is, a routing field with respect to the second node to confirm transmission of the data from the second node. The third node may transmit response data to the second node in the unicast scheme. The second node may confirm a routing table to transmit data to the first node, and the first node may confirm the routing field to transmit the data to the coordinator node.

In a ZigBee routing scheme among routing schemes, a used amount of a memory according to routing is small. Each node may include only information on peripheral nodes at which a signal reaches. However, upon traffic response in order to search a path, a data size may be increased.

In a case of Z wave routing, data may be transmitted as follows.

For example, when the first node transmits data to the fourth node, the first node may compare RSSI in a table with respect to an entire network to calculate an optional path transmitting data the fourth node. The first node may transmit the data to the second node in a unicast scheme, and the second node may compare an RSSI signal in a stored network table to create an optional path. The first node may determine an optimal path by comparing RSSI with respect to data received in the same manner as in the third node to transmit data in the unicast scheme.

The fourth node may compare RSSI in the network table and calculate an optimal path to the first node to transmit the data to the third node in a unicast scheme. The third node may transmit the data to the second node by RSSI comparison and the second node transmit the data to the firth node by the RSSI comparison.

A case of Z wave routing has no presence of specially managing a network. An optimal path may be obtained based on RSSI data to minimize network traffic. As all nodes update and store a routing table of an entire network each time nodes are connected with each other, there is a large used amount of a memory.

Embodiments disclosed herein may transmit data by applying a routing scheme being a combination of the ZigBee routing scheme and the Z wave routing scheme using a sub-giga band frequency. As shown in FIG. 9, a master node is operated as a coordinator node 241.

The following is a case where a master node 241 being a coordinator node transmits data to the third node.

A coordinator node may confirm association of a third node being a target node (S31), and transmit data to the first node 242 in a broadcast scheme (S32). A first node may confirm association with the target node (S33), and transmit data to the second node 243 in the broadcast scheme (S34). Accordingly, the second node may confirm association with the target node (S35), and transmit data to the third node 244 in the unicast scheme because the third node is a child node (S36).

The third node may confirm whether the data received from the second node is data of the third node to generate corresponding response data (S37) and transmit the generated response data to an upper parent node (S38). The second node may generate response data to the upper node based on received data (S39) and transmit the generated response data to the first node being a parent node in the unicast scheme (S40). The first node may generate response data to the upper node based on received data (S41), and transmit the generated response data to the first outdoor unit being a parent node in the unicast scheme (S42).

In embodiments disclosed herein, each node does not store the entire routing table but stores only information on the parent node and the child node and a master node being a coordinator node stores all data by transmitting data using the above routing algorithm, so that a small amount of a memory is used. As a connection form of the network is determined, there is no need to continuously search halfway so that a small amount of a bandwidth of the network is used. However, when a problem occurs at a node, a new path may not be searched. Accordingly, as described above, embodiments disclosed herein abandon corresponding data and restart a node in which an error occurs to retransmit the data.

Figure 10:
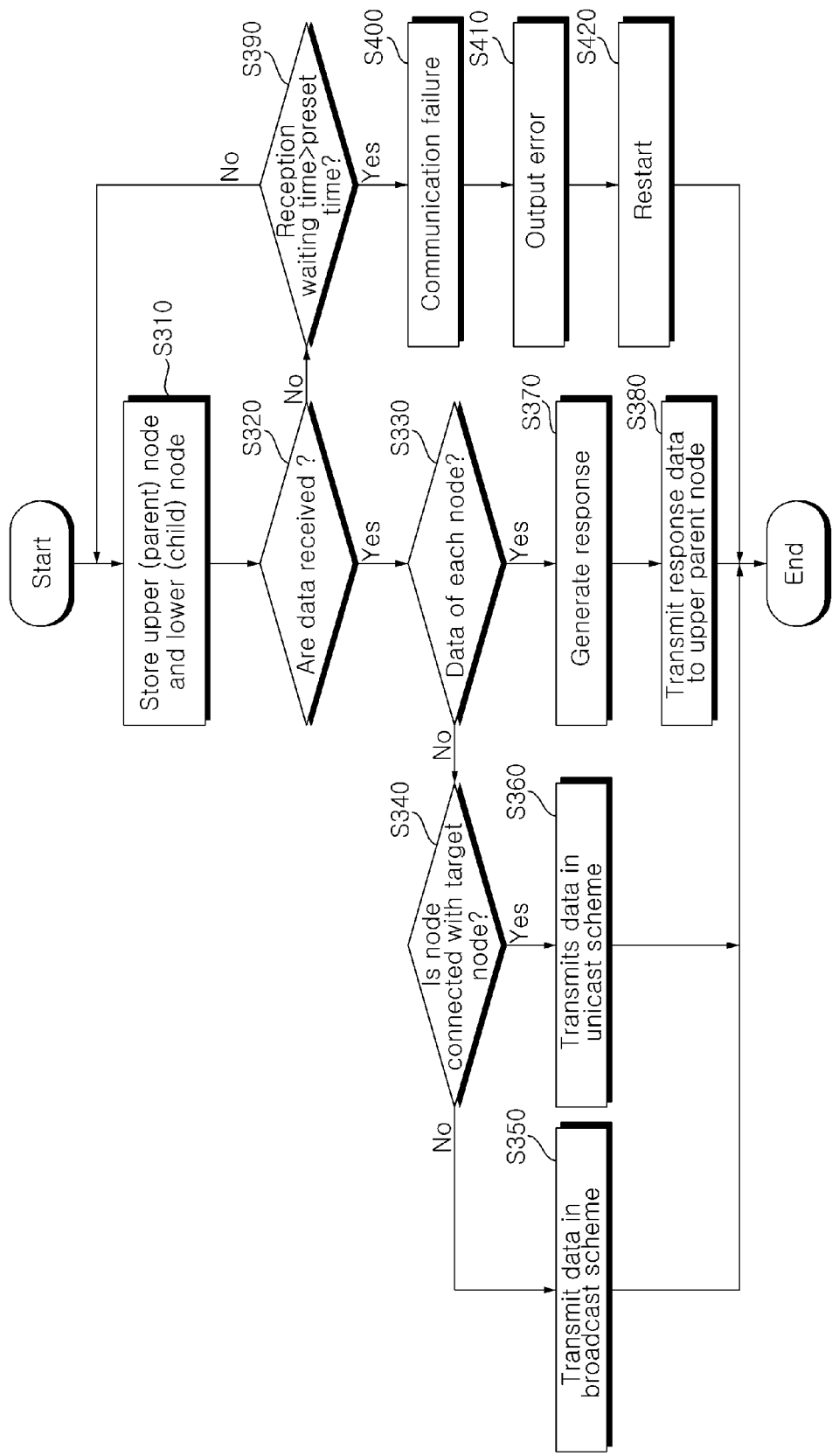
FIG. 10 is a flow chart illustrating a control method for wireless communication in the air conditioner according to an embodiment.

FIG. 10 is a flow chart illustrating a control method for wireless communication in the air conditioner according to an embodiment. As described above, a plurality of units except for the master node may store only information on the parent node and the child node and confirm a reception target of a signal to transfer the signal.

As shown in FIG. 10, a plurality of node may store a parent node being an upper node and a child node being a lower node in a routing table (S310). The master node may store addresses of all nodes.

If data is received (S320), each node may confirm whether the received data is data of each node (S330). When the received data is data of each node, the node may generate response data (S370). A communication unit may convert the received data to determine whether response is possible. When immediate response is possible, the communication unit may generate response data based on stored data. When the immediate response is impossible, the communication unit may provide data to a controller and generate response data corresponding to data received from the controller.

The communication unit may transmit the response data to an upper parent node in a unicast scheme (S380). When the received data is not the data of each node, the node may confirm a target node, that is, a receiver of data to determine whether the node is connected with the target node (S340).

When the node is not connected with the target node, the node may transmit data in the broadcast scheme (S350). When the node is connected with the target node, that is, when the target node is a parent node or a child node, the node may transmit data in a unicast scheme (S360). However, when the node receives the data from a child node, the node may transmit the data to a parent node in a unicast scheme.

The node may update information on a parent node at a predetermined time interval. In this case, when data is not received for a predetermined time or longer (S390), the node may determine that communication fails (S400).

The node may output an error (S410), and turn-off power within a predetermined time and again provide power to restart (S420). After restart, if the node is normally operated, communication may restart.

As a peripheral node, that is, a parent node or a child node of a node in which communication fails does not receive data from a node in which failure occurs, the node may determine a communication error to transmit error information to a parent node. Accordingly, a master node of a final stage may confirm a node in which failure occurs.

In embodiments disclosed herein, a plurality of nodes may be operated as an intermediate node and transmit data which allows a plurality of units to communicate with each other. The plurality of nodes may store only information on the parent node and the child node in a routing table to transmit data so that a transmission structure of a network may be simplified to reduce network traffic and load of the node.

Embodiments disclosed herein provide an air conditioner and a control method thereof and, more particularly, an air-conditioner where a plurality of units included in the air conditioner transmit/receive data in a wireless scheme, and a control method thereof.

Embodiments disclosed herein provide an air conditioner that may include a plurality of units including an outdoor unit and an indoor unit, and distributed at a plurality of layers or levels or floors; and a control unit or controller configured to monitor and control the plurality of units. The control unit and the plurality of units may include a communication unit configured to transmit/receive data in a wireless communication scheme, respectively. One of the plurality of units may be configured as a master node, and remaining units except for the unit configured as the master node may be configured as slave nodes, respectively, so that the slave node stores information on an upper parent node and a lower child node in a routing table to transmit data.

The master node may store a routing table including address information on the plurality of units. The slave node may transmit the received data to the upper parent node or the lower childe node.

When the slave node receives data from the child node, the slave node may transmit the data to the parent node in a unicast scheme. The slave node may determine whether a target node of received data is a connected node, and the slave node may transmit the data to the parent node or the child node in a unicast scheme when the target node of received data is the connected node.

The slave node may determine whether a target node of received data is a connected node, and the slave node may transmit the data in a broadcast scheme when the target node of received data is the connected node. The master node may confirm an address of a target node being a reception target of data to transmit the data in a broadcast scheme.

The slave node may communicate with the parent node at a preset or predetermined time interval to update information on the parent node. When data are not received for a preset time or longer, the slave node may determine communication failure to output an error.

Embodiments disclosed herein provide a control method of an air conditioner that may include configuring one of a plurality of units including an outdoor unit and an indoor unit, and distributed at a plurality of layers or levels or floors as master nodes and configuring mainlining units except for the unit configured as the master node as slave nodes, respectively; storing information on an upper parent node and a lower child node in a routing table by the slave nodes; transmitting data to a second slave node of the slave nodes by the master node; receiving the data from the master node by a first slave node of the slave nodes; determining whether there is a connection of the second slave node by the first slave node; and transmitting the data to the second slave node by the first slave node. The master node may transmit the data to the second salve node with reference to a routing table configured to store address information on all nodes.

The control method of an air conditioner may further include transmitting the data to the second slave node in a unicast scheme by the first slave node when the second slave node is a connection node. The control method of an air conditioner may further include transmitting the data in a broadcast scheme by the first slave node when the second slave node is a connection node; receiving the data from the first slave node by the third slave node; and transmitting the data to the second slave node in a unicast scheme when the third slave node is a child node. The control method of an air conditioner may further include generating response data with respect to the data by the second slave node; and transmitting the data to a preset parent node by the second slave node.

In the air conditioner and the control method thereof according to embodiments disclosed herein, as a plurality of units in the air conditioner transmit/receive data in a wireless communication scheme, direction communication between an indoor unit and an indoor unit and between the indoor unit and an outdoor unit may be performed regardless of an installation environment, and the indoor may directly communicate with the control unit without the outdoor unit. In the embodiments disclosed herein, in order to transmit data in a wireless scheme, the plurality of units in the air conditioner may be operated as one node during transferring the data, respectively, a plurality of nodes do not include a routing table and stores only information on a parent node and a child node which are directly connected so that a routing structure may be simplified.

Further, although the air conditioner includes a plurality of units, it is easy to install the units and to configure a wireless network accordingly to embodiments disclosed herein. When the units perform functions of the node, a load of each node is reduced. Network traffic of the air conditioner is reduced by minimizing unnecessary routing table so that the transmission efficiency is improved.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
a plurality of units including an outdoor unit and an indoor unit, the plurality of units being distributed at a plurality of levels in a building;
a controller configured to monitor and control the plurality of units, wherein the controller and the plurality of units include a communication unit configured to transmit/receive data in a wireless communication scheme, respectively, and wherein one of the plurality of units is configured as a master node, and remaining units except for the unit configured as the master node are configured as slave nodes, wherein the master node stores information on all the units in a routing table, and the slave nodes store information on a parent node and a child node in a routing table to transmit data, when the master node transmits a first data to a second slave node, as a target node among the slave nodes, in a broadcast scheme, and a first slave node, among the slave nodes, receives the first data from the master node:
the first slave node transmits the first data to a parent node of the first slave node in a unicast scheme when the second slave node is the parent node of the first slave node,
the first slave node transmits the first data to a child node of the first slave node in the unicast scheme when the second slave node is the child node of the first slave node, and
the first slave node transmits the first data in a broadcast scheme when the second slave node is not the child node or the parent node of the first slave node,
when the first slave node receives a second data from the child node of the first slave node, the first slave node transmits the second data to the parent node of the first slave node in the unicast scheme regardless of whether a target node is the parent node, wherein the target node of the second data is the master node,
wherein the slave nodes store only information of the parent node and the child node without storing information of other nodes in a routing table,
wherein when data is not received for a first predetermined time or longer, the first slave node determines communication failure to output an error,
wherein when the communication failure occurs, the second slave node waits for a second predetermined time to turn-off power and restart,
wherein after the second slave node restarts, the second slave node restarts communication, and
wherein when the communication failure occurs, a new path for transmitting data is not searched by the mater node or the slave node.

2. The air conditioner of claim 1, wherein the master node stores a routing table including address information for the plurality of units.

3. The air conditioner of claim 1, wherein the master node confirms an address of a target node being a reception target of data to transmit the data in a broadcast scheme.

4. The air conditioner of claim 1, wherein the slave node communicates with the parent node at a predetermined time interval to update information on the parent node.

5. A method for controlling an air conditioner the method comprising:
configuring one of a plurality of units including an outdoor unit and indoor units, the plurality of units being distributed at a plurality of levels in a building as master nodes and configuring remaining units except for the unit configured as the master node as slave nodes, respectively;
storing only information on a parent node and a child node without storing information of other nodes in a routing table by the slave nodes;
transmitting, by the master node, a first data to a second slave node, among the slave nodes as a target node, in a broadcast scheme;
receiving the first data from the master node by a first slave node among the slave nodes;
determining, by the first slave node, whether the second slave node is a parent node or a child node of the first slave node;
transmitting, by the first slave node, the first data, to the second slave node in a unicast scheme when the second slave node is determined to be the parent node or the child node of the first slave node;
transmitting, by the first slave node, the first data, to the second slave node in a broadcast scheme when the second slave node is determined to not be the parent node or the child node of the first slave node;
receiving, by the first slave node, a second data from the child node of the first slave node;
transmitting, by the first slave node, the second data to the parent node of the first slave node in a unicast scheme regardless of whether the target node is the parent node, wherein a target node of the second data is the master node;
outputting, by the second slave node, a communication error to restart when data is not received in the second slave node for a predetermined time or longer;
transmitting, by the first slave node, the communication error of the second slave node to the master node when data is not received from the second slave node for the predetermined time or longer; and
restarting, by the second slave node, communication after the second slave node restarts,
wherein when the communication error occurs, a new path for transmitting data is not searched by the mater node or the slave node.

6. The method of claim 5, wherein the master node transmits the first data to the second slave node with reference to a routing table configured to store address information on all nodes.

7. The method of claim 5, further comprising:
receiving the first data from the first slave node by a third slave node; and
transmitting, from the third slave node, the first data to the second slave node in a unicast scheme when the second slave node is a child node of the third slave node.

8. The method of claim 5, further comprising:
generating, by the second slave node, response data with respect to the first data; and
transmitting, by the second slave node, the response data, to a parent node of the second slave node in a unicast scheme.

9. The method of claim 8, further comprising:
transmitting, by the second slave node, the response data to the first slave node in a unicast scheme when the parent node of the second slave node is the first slave node; and
transmitting, by the first slave node, the response data to the master node being a parent node in the unicast scheme.

10. An air conditioner for a multi-story building, comprising:
a plurality of outdoor and indoor units, the plurality of outdoor and indoor units being distributed at a plurality of levels in the multi-story building including the roof and basement; and
a controller configured to monitor and control the plurality of outdoor and indoor units, wherein the controller and the plurality of outdoor and indoor units include a communication unit configured to transmit/receive data in a wireless communication scheme, respectively, and wherein one of the plurality of outdoor and indoor units is configured as a master node, and remaining units except for the unit configured as the master node are configured as slave nodes, respectively, so that the slave nodes store information on a parent node and a child node in a routing table to transmit data, and wherein when the master node transmits the data to a target node, among the slave nodes, in a broadcast scheme, the slave node transmits a received data to the parent node or the child node in a unicast scheme when the target node of the received data is the parent node or the child node of the slave node, transmits the received data in a broadcast scheme when the target node of the received data is not the parent node or the child node of the slave node and the received data is not from the child node, and transmits the received data to the parent node in a unicast scheme regardless of whether the target node is the parent node when the received data is received from the child node, wherein the slave nodes store only information of the parent node and the child node without storing information of other nodes in a routing table, wherein when data is not received for a first predetermined time or longer, the slave node determines communication failure to output an error, wherein when the communication failure occurs, the slave node waits for a second predetermined time to turn-off power and restart, wherein after the slave node restarts, the slave node restarts communication, and wherein when the communication failure occurs, a new path for transmitting data is not searched by the mater node or the slave node.

* * * * *